US012502898B2

(12) United States Patent
Mun Hon et al.

(10) Patent No.: US 12,502,898 B2
(45) Date of Patent: Dec. 23, 2025

(54) PRINTER WITH TABS TO SECURE PLATEN ROLLER BUSHING

(71) Applicant: ZEBRA TECHNOLOGIES CORPORATION, Lincolnshire, IL (US)

(72) Inventors: Randal Wong Mun Hon, Singapore (SG); Shu-Hsun Jason Chiang, Hsinchu (TW); Kuan-Ying Lu, Taichung (TW); Chia-Wen Chang, Hsinchu (TW); Hsinghan Tsai, Hsinchu (TW)

(73) Assignee: Zebra Technologies Corporation, Lincolnshire, IL (US)

( * ) Notice: Subject to any disclaimer, the term of this patent is extended or adjusted under 35 U.S.C. 154(b) by 56 days.

(21) Appl. No.: 18/443,999

(22) Filed: Feb. 16, 2024

(65) Prior Publication Data

US 2024/0190147 A1 Jun. 13, 2024

Related U.S. Application Data

(63) Continuation of application No. 17/586,357, filed on Jan. 27, 2022, now Pat. No. 11,904,603.

(51) Int. Cl.

| | |
|---|---|
| ***B41J 11/04*** | (2006.01) |
| ***B41J 2/32*** | (2006.01) |
| ***B41J 3/36*** | (2006.01) |
| ***B41J 3/407*** | (2006.01) |

(52) U.S. Cl.

CPC ................ *B41J 11/04* (2013.01); *B41J 2/32* (2013.01); *B41J 3/36* (2013.01); *B41J 3/4075* (2013.01)

(58) Field of Classification Search

CPC ... B41J 11/02; B41J 11/04; B41J 2/315; B41J 2/32; B41J 3/36; B41J 3/407; B41J 3/4075

See application file for complete search history.

(56) References Cited

U.S. PATENT DOCUMENTS

| | | | | |
|---|---|---|---|---|
| 4,802,795 | A | 2/1989 | Takada | |
| 6,744,457 | B2 | 6/2004 | Seino et al. | |
| 8,979,407 | B2 | 3/2015 | Butzen et al. | |
| 9,035,985 | B2 | 5/2015 | Kato et al. | |
| 10,759,200 | B2 | 9/2020 | Ando | |
| 2014/0292992 | A1* | 10/2014 | Kato | B41J 15/042 347/220 |
| 2021/0252882 | A1* | 8/2021 | Sanada | B41J 11/04 |
| 2021/0331493 | A1 | 10/2021 | Kim et al. | |

OTHER PUBLICATIONS

International Search Report and Written Opinion for International Application No. PCT/US2023/11503 mailed on Apr. 12, 2023.

* cited by examiner

*Primary Examiner* — Douglas X Rodriguez
*Assistant Examiner* — Kendrick X Liu

(57) ABSTRACT

An example printer including: a platen roller; a bushing connected to the platen roller, the bushing having a wing extending radially from the bushing; and a lower frame including: a channel to receive the platen roller in an operational position in which the platen roller is configured to feed media for a print head of the printer; an end piece defining an end of the channel, the end piece having an opening to receive the bushing when the platen roller is in the operational position; and a tab on the end piece, the tab positioned to interface with the wing of the bushing to secure the bushing in the opening such that the platen roller is maintained in the operational position within the channel.

17 Claims, 8 Drawing Sheets

PRINTER WITH TABS TO SECURE PLATEN ROLLER BUSHING

RELATED APPLICATIONS

This application is a continuation of U.S. patent application Ser. No. 17/586,357, filed on Jan. 27, 2022, which is incorporated by reference herein in its entirety.

BACKGROUND

Printers may include platen rollers to feed media past the print head and to maintain the media in consistent contact with the print head. Platen rollers are driven by motors, which may sometimes exert sufficient force on the platen rollers to cause them to be displaced and cause issues, such as pixel outs on the print head or stalling by the motor, during a print job.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
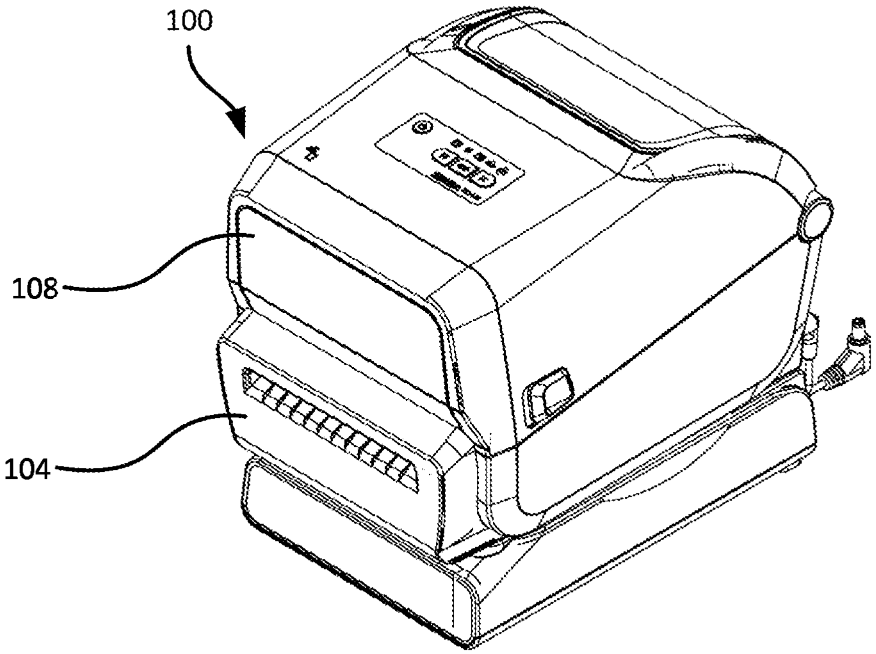
FIG. 1A is a perspective view of an example printer with tabs to secure the platen roller bushing.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a printer including: a platen roller: a bushing connected to the platen roller, the bushing having a wing extending radially from the bushing: and a lower frame including: a channel to receive the platen roller in an operational position in which the platen roller is configured to feed media for a print head of the printer: an end piece defining an end of the channel, the end piece having an opening to receive the bushing when the platen roller is in the operational position; and a tab on the end piece, the tab positioned to interface with the wing of the bushing to secure the bushing in the opening such that the platen roller is maintained in the operational position within the channel.

FIG. 1A depicts a perspective view of an example printer 100 in accordance with the teachings of this disclosure. The printer 100 includes a lower frame 104 and a cover 108 which are coupled to house various internal components of the printer 100.

Figure 1B:
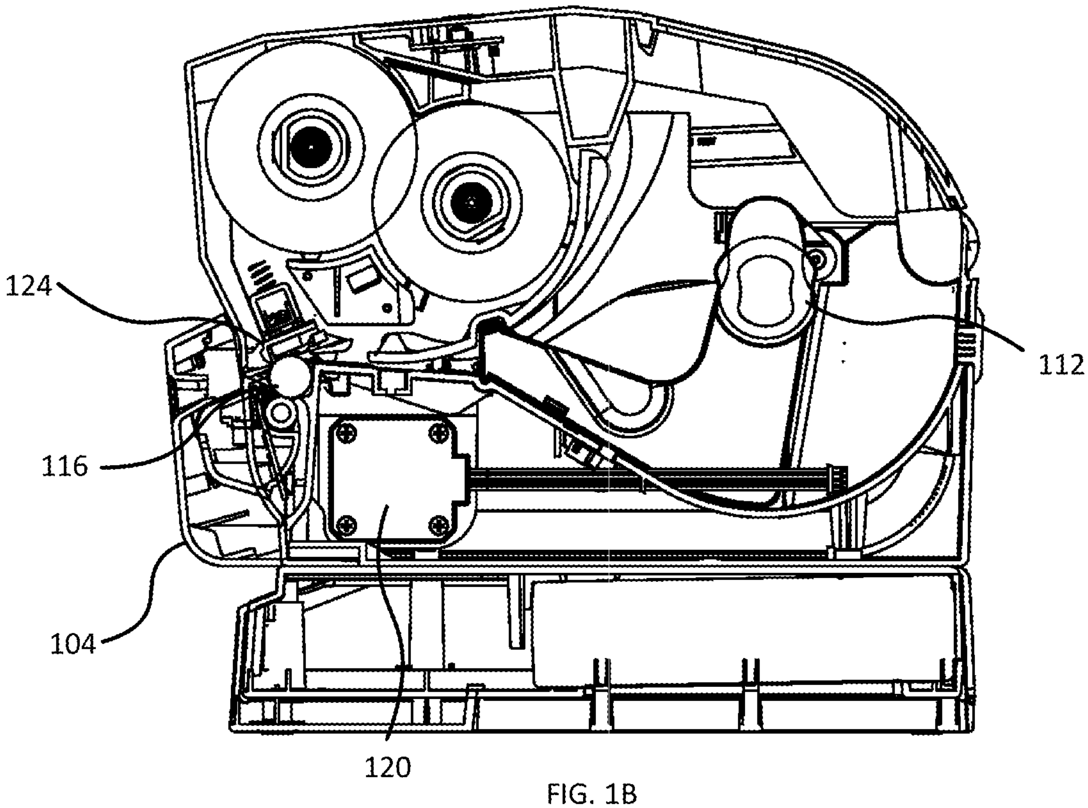
FIG. 1B is a side cross-sectional view of the printer of FIG. 1A.

For example, FIG. 1B depicts a cross section of the printer 100. The lower frame 104 may have a media support 112 configured to support a media supply configured to hold media to supply for print operations, a platen roller 116 configured to feed the media from the media supply during print operations, a motor 120 to drive the platen roller 116, and other components of the printer 100. The cover 108 may support a print head 124 configured to print onto the media, and other components of the printer 100.

In operation, during a print job, the motor 120 drives the platen roller 116 to feed media from the media supply past the print head 124 to allow the print head 124 to print onto the media. Accordingly, the platen roller 116 and the print head 124 are positioned on the lower frame 104 and the cover 108, respectively, to align with one another. Additionally, the platen roller 116 may have an operational position relative to the print head 124, in which the platen roller 116 is configured to maintain consistent contact of the media with the print head 124 during a print job. In particular, in the operational position, the platen roller 116 is substantially parallel to the print head 124 so that the media is biased against the print head 124 consistently across the length of the platen roller 116.

Figure 2:
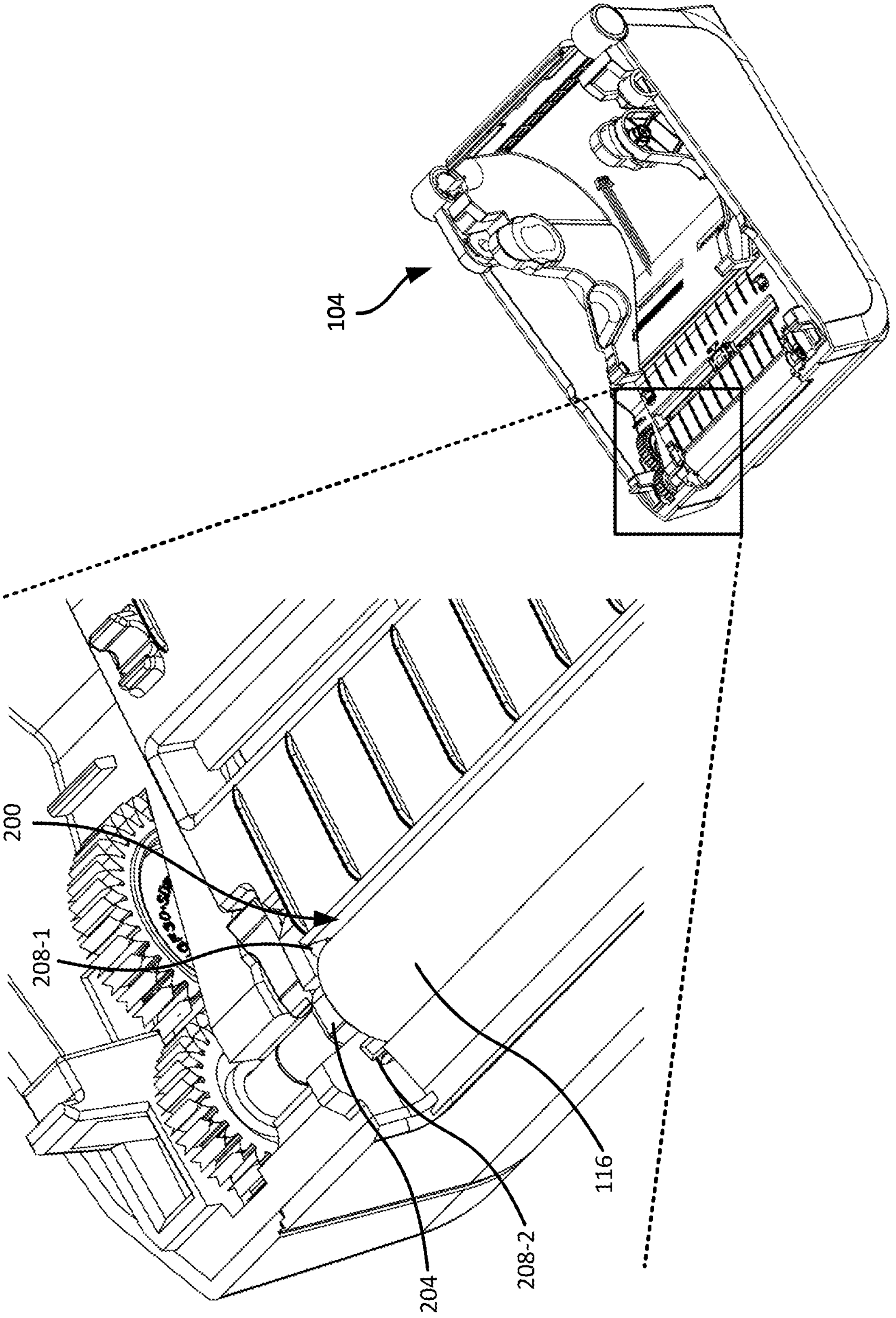
FIG. 2 is detailed perspective view of the lower frame of the printer of FIG. 1A.

For example, referring to FIG. 2, a perspective view of the lower frame 104 is depicted, with the platen roller 116 in its operational position. In the operational position, the platen roller 116 is suitably positioned to feed media past the print head 124 during a print job as well as being positioned to maintain the media in consistent contact with the print head 124. In particular, the lower frame 104 may include a channel 200 formed as a depression or space in the lower frame 104 which is configured to receive the platen roller 116 in its operational position.

The printer 100 may further include a bushing 204 connected to the platen roller 116 to support the platen roller 116 in the channel 200 and to allow the platen roller 116 to rotate in its operational position, as driven by the motor 120. However, the driving force of the motor 120 may sometimes exert a force on the platen roller 116 which causes the platen roller 116 to be displaced from channel 200, out of the operational position. This may cause delays in the print operation, pixel outs on the printhead, or other issues with the print job. Accordingly, as described further herein, the printer 100, and in particular, the lower frame 104 may further include tabs 208-1 and 208-2 (referred to herein generically as a tab 208 and collectively as tabs 208: this nomenclature is also used elsewhere herein) to secure the platen roller 116 in the operational position within the channel 200 via interaction with the bushing 204, as will be described further herein.

Figure 3:
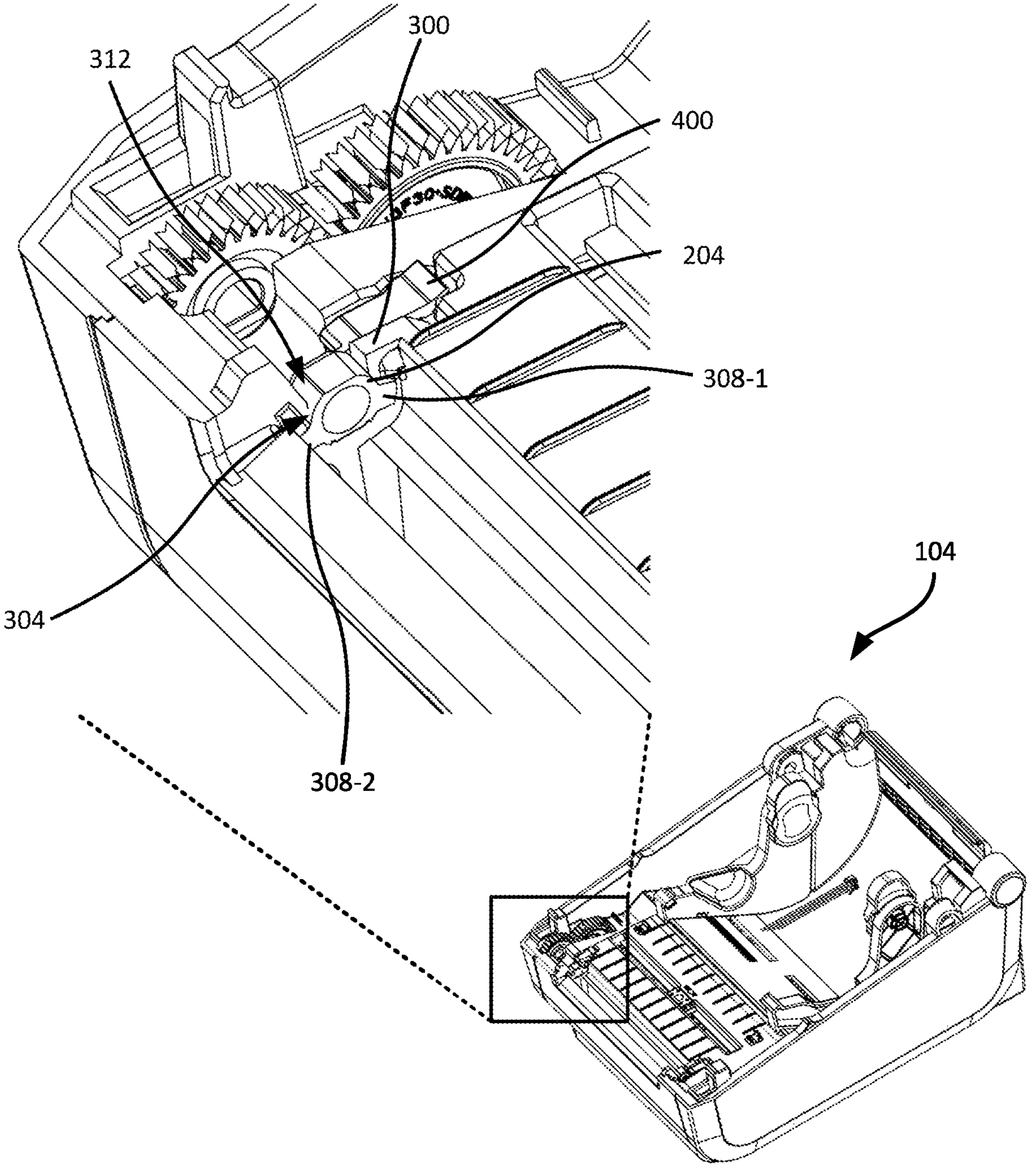
FIG. 3 is a detailed perspective view of the lower frame of the printer of FIG. 1A with the platen roller omitted.

Referring to FIG. 3, a perspective view of the lower frame 104 is depicted, with the platen roller 116 omitted for clarity. The lower frame 104 includes an end piece 300 having an opening 304 defined therein.

The end piece 300 is a portion of the lower frame 104 defining an end of the channel 200. The opening 304 receives the bushing 204. A corresponding bushing connected to an opposing end of the platen roller 116 and a corresponding end piece and opening at an opposing end of the channel 200 allow the platen roller 116 to be received and supported in the channel 200 in the operational position. That is, when the bushings 204 are received within the openings 304 of the end pieces 300, the platen roller 116 is in the operational position within the channel 200.

The tabs 208 are formed as protrusions on the lower frame 104, and in particular, on the end piece 300, and are configured to secure the bushing 204 in the opening 304 such that the platen roller 116 is maintained in the operational position within the channel 200.

In particular, the bushing 204 includes wings 308-1 and 308-2 which extend radially from the bushing 204, substantially opposite one another. Accordingly, when the bushing 204 is received in the opening 304 of the end piece 300 (i.e., when the platen roller 116 is in the operational position), the wings 308 may extend over respective portions of the end piece 300. Accordingly, the tabs 208 are positioned on the end piece 300 to interface with the wings 308 to secure the bushing 204 in the opening 304 such that the platen roller 116 is also maintained in the operational position within the channel 200.

More particularly, the opening 304 includes a mouth 312 defined in the end piece 300, by which the bushing 204 is received into the opening 304, and a seat opposite the mouth 312, which supports the bushing 204 in the opening 304. The seat of the opening 304 may have a shape complementary to that of the bushing 204 (i.e., in the present example, substantially circular in cross-section to complement the substantially circular cross-section of the substantially cylindrical bushing 204). Accordingly, if the bushing 204 is displaced from the opening 304, it may typically be displaced out of the opening 304 via the mouth 312. Thus, to maintain the bushing 204 in the opening 302, the tabs 208 may be proximate the mouth 312 of the opening 304, on opposing sides of the mouth 312 to correspond with the opposing wings 308 extending from the bushing 204. That is, the tabs 208 are closer to the mouth 312 than the wings 308, and interface with the wings 308 to restrict the wings 308 from passing the tabs 208 to secure the bushing 204 in the opening 304.

Figure 4:
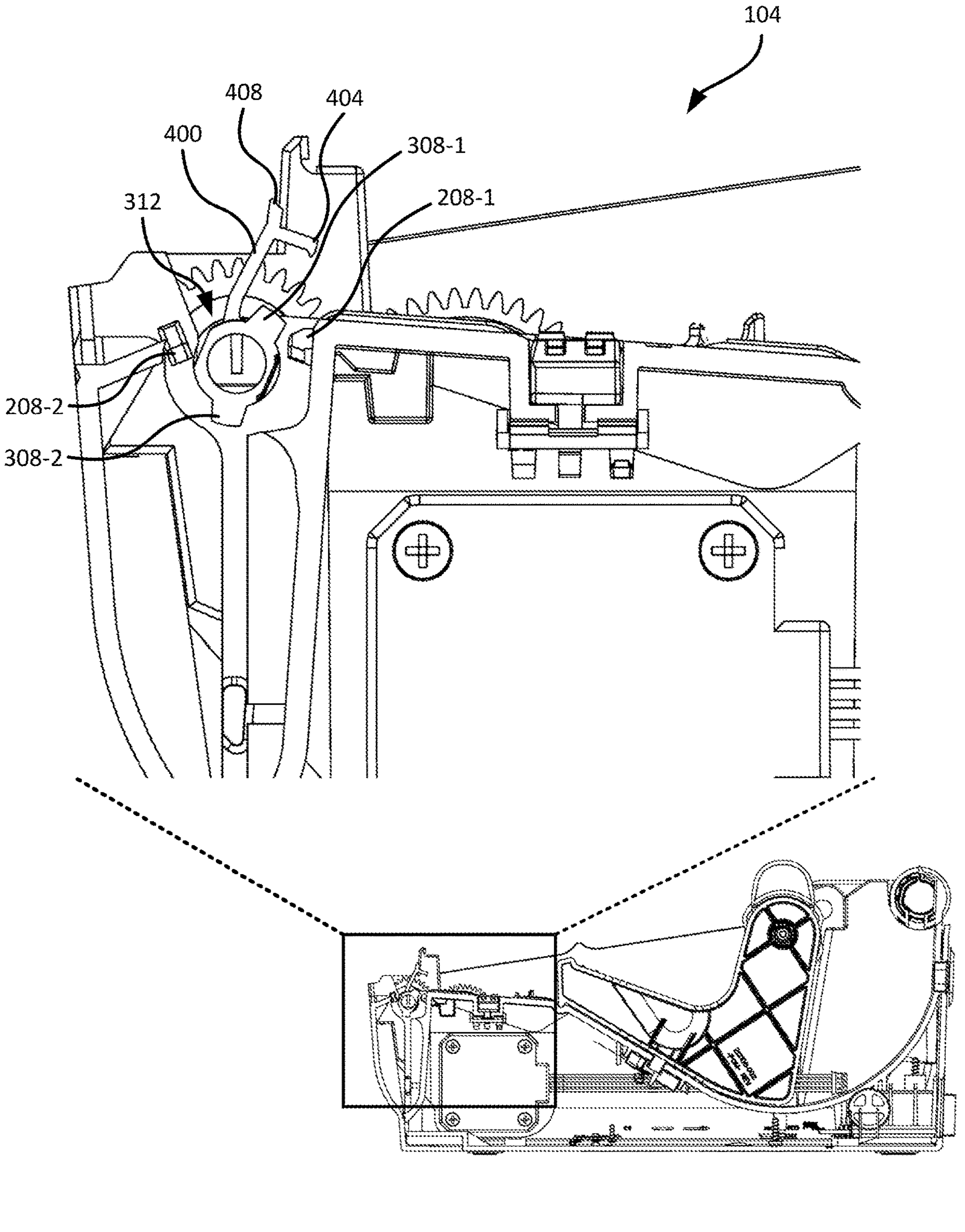
FIG. 4 is a detailed sidecross sectional view of the lower frame of the printer of FIG. 1A with the bushing in an unsecured position.

As will be appreciated, in such a configuration, the tabs 208 may interfere with the insertion and removal of the bushing 204 into or from the opening 304 via the mouth 312. Accordingly, the end piece 300 may be configured to receive the bushing 204 in an unsecured position, as depicted in FIG. 4. In the unsecured position, the first wing 308-1 of the bushing 204 is disposed on a first side of the first tab 208-1. The second wing 308-2 is disposed between a second side of the first tab 208-1 and the second tab 208-2. In particular, the first side of the first tab 208-1 is proximate the mouth 312 of the opening 304, while the second side of the first tab 208-1 is opposite the first side of the first tab 208-1 and is distal from the mouth 312 of the opening 304.

Figure 5:
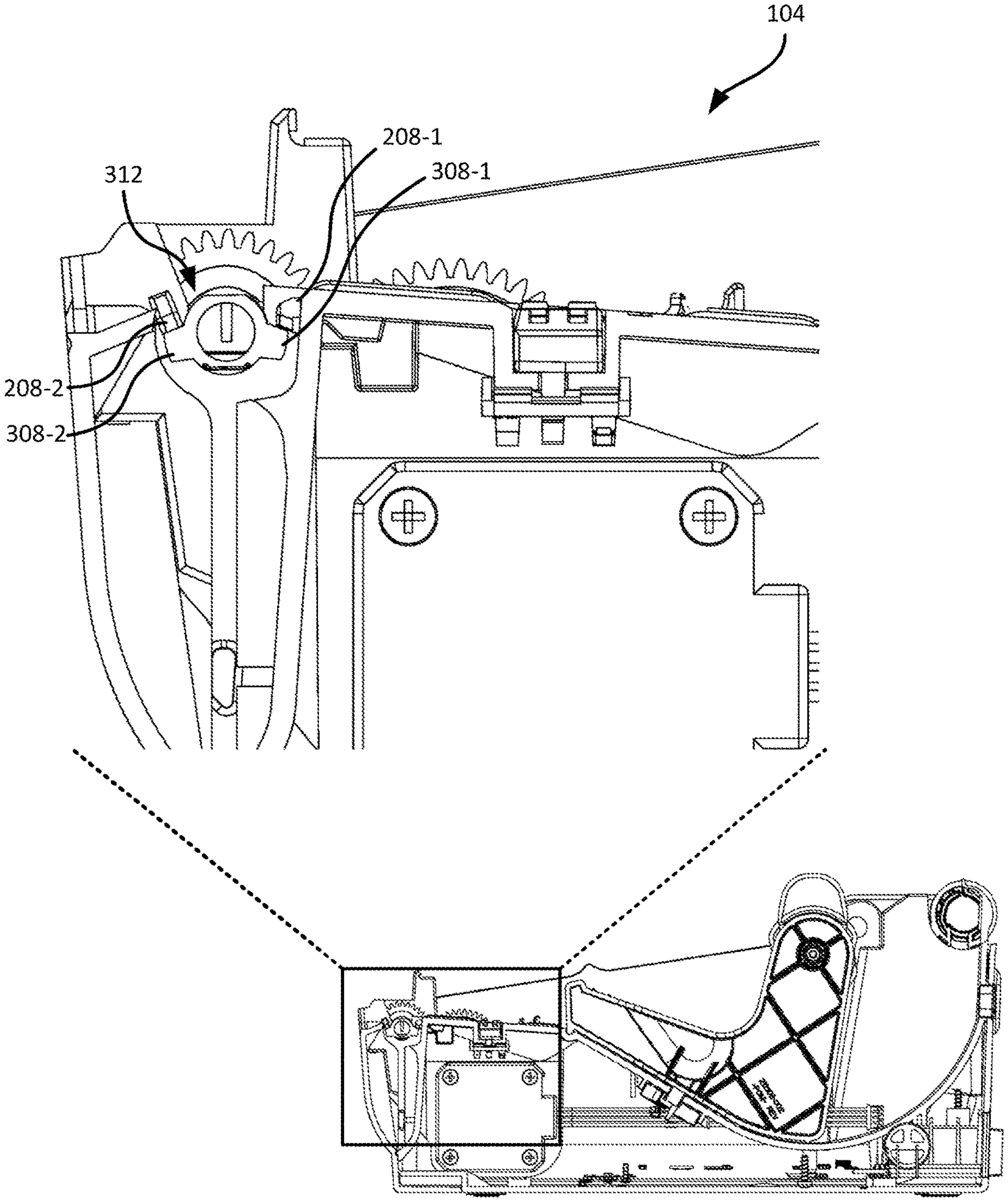
FIG. 5 is a detailed side-cross sectional view of the lower frame of the printer of FIG. 1A with the bushing in the secured position.

The bushing 204 may then be configured to rotate to a secured position, as depicted in FIG. 5. In particular, in order to maintain the platen roller 116 in the operational position, the bushing 204 may be configured to rotate about the rotational axis of the platen roller 116 (i.e., the axis about which the platen roller 116 rotates to feed media past the print head 124). As described above, in the secured position, the wings 308 of the bushing 204 interface with the tabs 208, at the side of the tabs 208 further from the mouth 312 to restrict the bushing 204 from being displaced from the opening 304 via the mouth 312. Accordingly, to rotate the bushing 204 from the unsecured position to the secured position, the first wing 308-1 rotates from the first side of the first tab 208-1, past the first tab 208-1, to the second side of the first tab 208-1. The second wing 308-2 rotates from a position in between the first tab 208-1 and the second tab 208-2 to abut the second tab 208-2.

Figure 6:
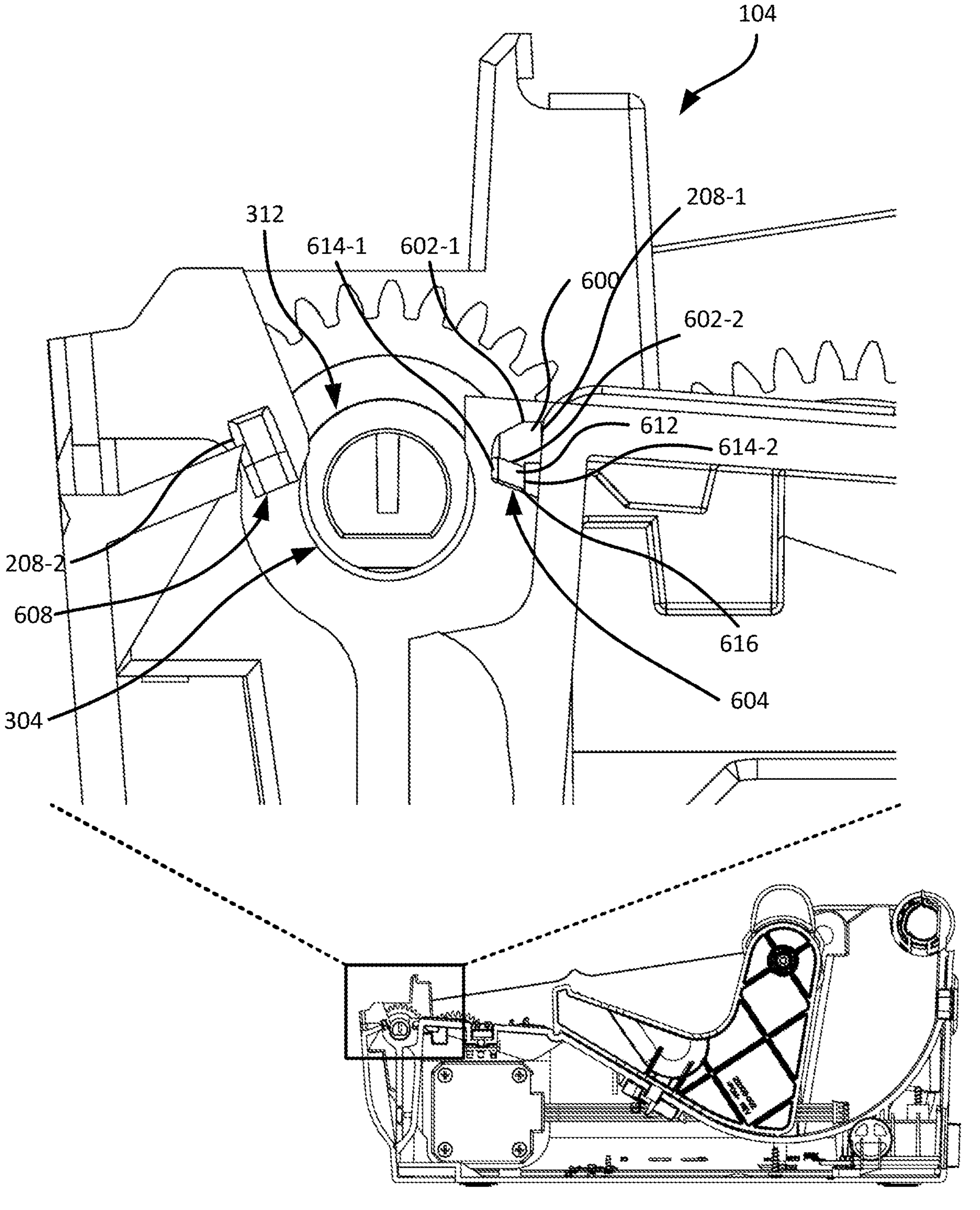
FIG. 6 is a detailed side-cross sectional view of the lower frame of the printer of FIG. 1A with the platen roller and the bushing omitted.

FIG. 6 depicts a detail side cross-sectional view of the lower frame 104 with the platen roller 116 and the bushing 204 omitted for clarity. To facilitate the rotation of the bushing 204 from the unsecured position to the secured position, the first tab 208-1 is defined on the first side by an entry surface 600. The entry surface 600 is angled to guide the first wing 308-1 past the tab 208-1 from its first side (i.e., proximate the mouth 312) to its second side (i.e., distal from the mouth 312) as the bushing rotates from the unsecured position to the secured position. That is, the entry surface 600 is angled such that an edge 602-1 of the entry surface 600 adjacent the end piece 300 is closer to the mouth 312 than an opposing edge 602-2 of the entry surface 600 defining the protrusion of the tab 208-1 away from the end piece 300. Thus, as the bushing 204 is rotated from the unsecured position to the secured position, the first wing 308-1 contacts the entry surface 600 proximate the mouth 312 (i.e., close to the edge 602-1) and is guided by the entry surface 600 away from the end piece 300 towards the edge 602-2 and past the tab 208-1.

In contrast, the second side of the tab 208-1 is defined by a retaining surface 604 which interfaces with the wing 308-1 to maintain the bushing 204 in the opening 304. In particular, the retaining surface 604 is substantially parallel to a corresponding side of the wing 308-1 when the bushing 204 is in the secured position. Thus, contact between the retaining surface 604 and the wing 308-1 occurs consistently over the retaining surface 604, thereby restricting the wing 308-1 from moving past the tab 208-1. That is, the retaining surface 604 prevents the bushing 204 from being rotated from the secured position to the unsecured position without sufficient force. In particular, the retaining surface 604 is sized and shaped to have sufficient contact with the wing 308-1 such that the forces exerted by the motor 120 on the bushing 204 are generally not sufficient to allow the wing 308-1 to move past the tab 208-1 and allow the bushing 204 to be displaced from the opening 304.

The second tab 208-2 is similarly defined by a retaining surface 608 at the side of the second tab 208-2 distal from the mouth 312 of the opening 304. The retaining surface 608 is substantially parallel to a corresponding side of the wing 308-2 when the bushing 204 is in the secured position. Contact between the retaining surface 608 and the wing 308-2 occurs consistently over the retaining surface 608, thereby restricting the wing 308-2 from moving past the tab 208-2.

Since the wing 308-2 need not rotate past the second tab 208-2, the side of the second tab 208-2 proximate the mouth 312 of the opening need not be angled as an entry surface.

In the secured position, the interaction of the second wing 308-2 with the second tab 208-2, and in particular, with the retaining surface 608, restricts any further rotation of the bushing 204 (i.e., past the secured position), and therefore restricts the wing 308-1 from rotating away from the tab 208-1. Similarly, the interaction of the first wing 308-1 with the first tab 208-1, and in particular, with the retaining surface 604, restricts rotation of the bushing 204 in the opposite direction, for example, under the forces exerted by the motor 120 during a print operation, and therefore restricts the wing 308-2 from rotating away from the tab 208-1 (i.e., from the secured position back to the unsecured position). Additionally, since the wings 308 are substantially opposite one another, and since both retaining surfaces 604 and 608 retain the wings 308 at the distal side of the respective tabs 208-1 and 208-2 (i.e., distal relative to the mouth 312 of the opening 304), the tabs 208 therefore retain the wings 308 distal from the mouth 312. The tabs 208 thereby secure the bushing 204 in the opening 304 and prevent the bushing 204 from being displaced from the opening 304 via the mouth 312.

The bushing 204 and the platen roller 116 may therefore be secured during regular operation, however, as the printer 100 is used, and its components are subject to wear, certain components, including the platen roller 116 may need to be replaced. Accordingly, the tabs 208 may additionally include features to facilitate the rotation of the bushing 204 from the secured position to the unsecured position upon application of a sufficient force.

In particular, the tab 208-1 may be defined by a sidewall 612 between the entry surface 600 and the retaining surface 604. The sidewall 612 may be angled to facilitate rotation of the bushing 204 from the secured position to the unsecured position. In particular, an inner edge 614-1 of the sidewall 612 (i.e., the edge of the sidewall 612 proximate the opening 304) may be closer to the end piece 300 than an outer edge 614-2 of the sidewall 612 (i.e., the edge of the sidewall 612 distal from the opening 304).

Figure 7:
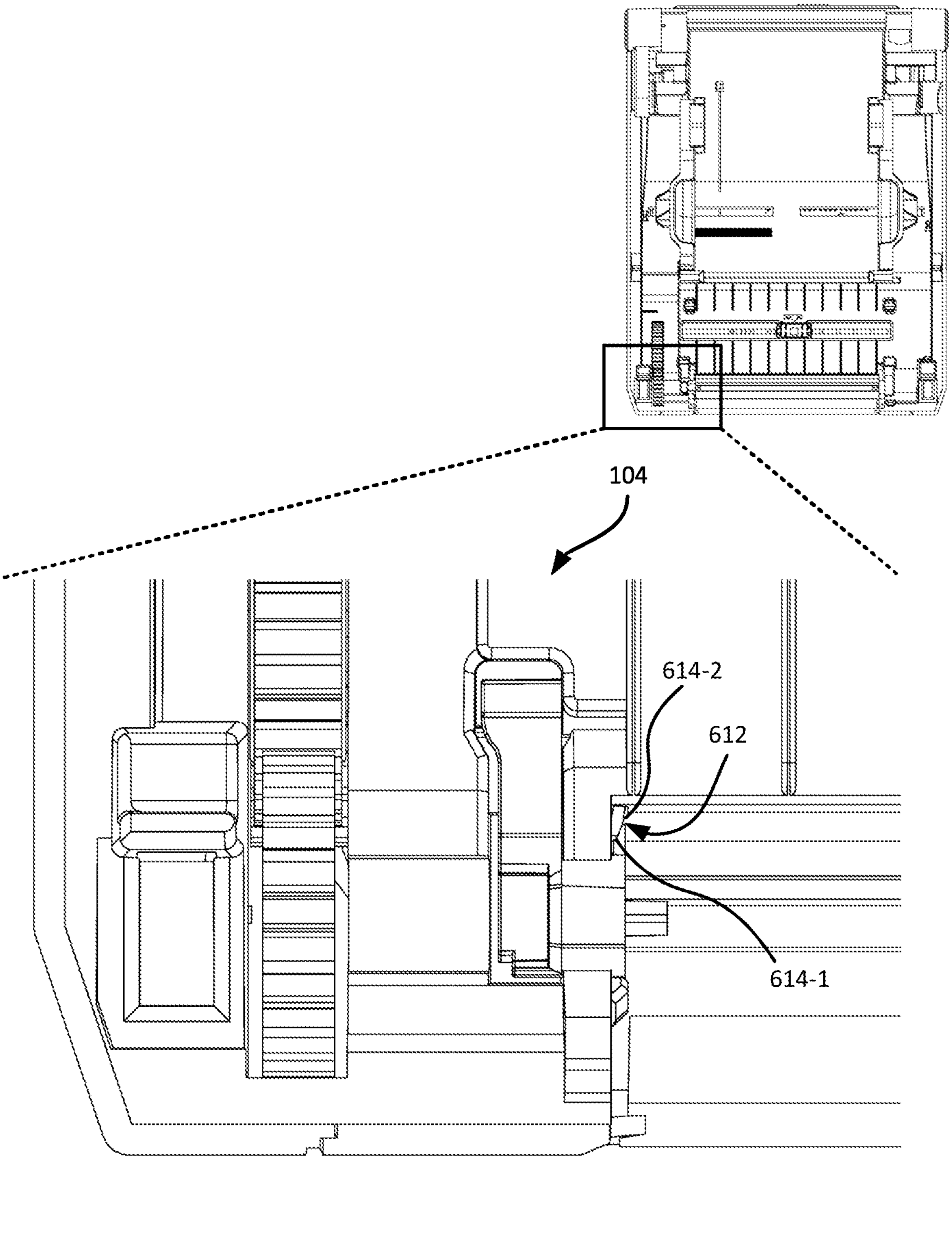
FIG. 7 is a detailed top view of the lower frame of the printer of FIG. 1A with the platen roller omitted.

For example, FIG. 7 depicts a detail top view of the lower frame 104. As can be seen, the sidewall 612 is angled away from the end piece 300 from the inner edge 614-1 of the sidewall 612 to the outer edge 614-2 of the sidewall 612. In particular, this allows for an inner portion of the wing 308-1 to have less contact with the retaining surface 604. Upon application of at least a threshold force, therefore, the wing 308-1 may be enabled to rotate past the retaining surface 604 at the inner edge 614-1 of the sidewall 612. The angle of the sidewall 612 may then enable the remainder of the wing 308-1 to be guided past the tab 208-1.

Additionally, the tab 208-1 may be positioned to extend from about a midpoint of the wing 308-1 to an outer end of the wing 308-1. The positioning of the tab 208-1 at an outer portion of the wing 308-1 may further facilitate the rotation of the wing 308-1 past the tab 208-1 upon application of at least the threshold force. The tab 208-2 may be positioned to substantially cover the wing 308-2.

The particular positioning of the tab 208-1 and the angle of the sidewall 612, which together contribute to the contact area of the retaining surface 604 with the wing 308-1, may be selected according to the average forces experienced by the bushing 204. In particular, the contact area of the retaining surface 604 and the wing 308-1 may be large enough that the average force exerted by the motor 120 on the bushing 204 is insufficient to displace the bushing 204 from the opening 304. That is, the tab 208-1 interfaces with the wing 308-1 to secure the bushing 204 in the opening 304 and maintains the platen roller 116 in the operational position within the channel 200. Additionally, the contact area of the retaining surface 604 and the wing 308-1 may be sufficiently small that upon application of at least the threshold force (i.e., greater than the average force exerted by the motor 120), the bushing 204 may be rotated from the secured position to the unsecured position to allow the platen roller 116 to be removed from the channel 200. The threshold force may be a force which can be exerted by an average user of the printer 100, to allow the platen roller 216 to be readily replaced by consumers.

Returning to FIG. 6, to further facilitate the rotation of the bushing 204 from the secured position to the unsecured position upon application of at least a threshold force, the retaining surface 604 may further include a stepped edge 616. That is, the edge 616 between the retaining surface 604 and the sidewall 612 may be stepped or angled. The stepped edge 616 may function similarly to the angled sidewall 612 to reduce the contact area between the retaining surface 604 and the wing 308-1 at a portion of the wing 308-1, and allow provide additional space for the wing 308-1 to be rotated past the retaining surface 604.

Returning now to FIG. 4, the bushing 204 may additionally include a lifting arm 400 to facilitate installing and removing the bushing 204 from the opening 304. The lifting arm 400 is securely attached to the body of the bushing 204 and acts as a lever arm to allow a user to rotate the bushing 204 between the secured position and the unsecured position. The lifting arm 400 further includes an extended hook 404 and a lifting tab 408. The extended hook 404 extends substantially perpendicular from the lifting arm 400 and has a hook or protrusion at the end that further serves to secure the bushing 204 in the secured position.

Figure 8:
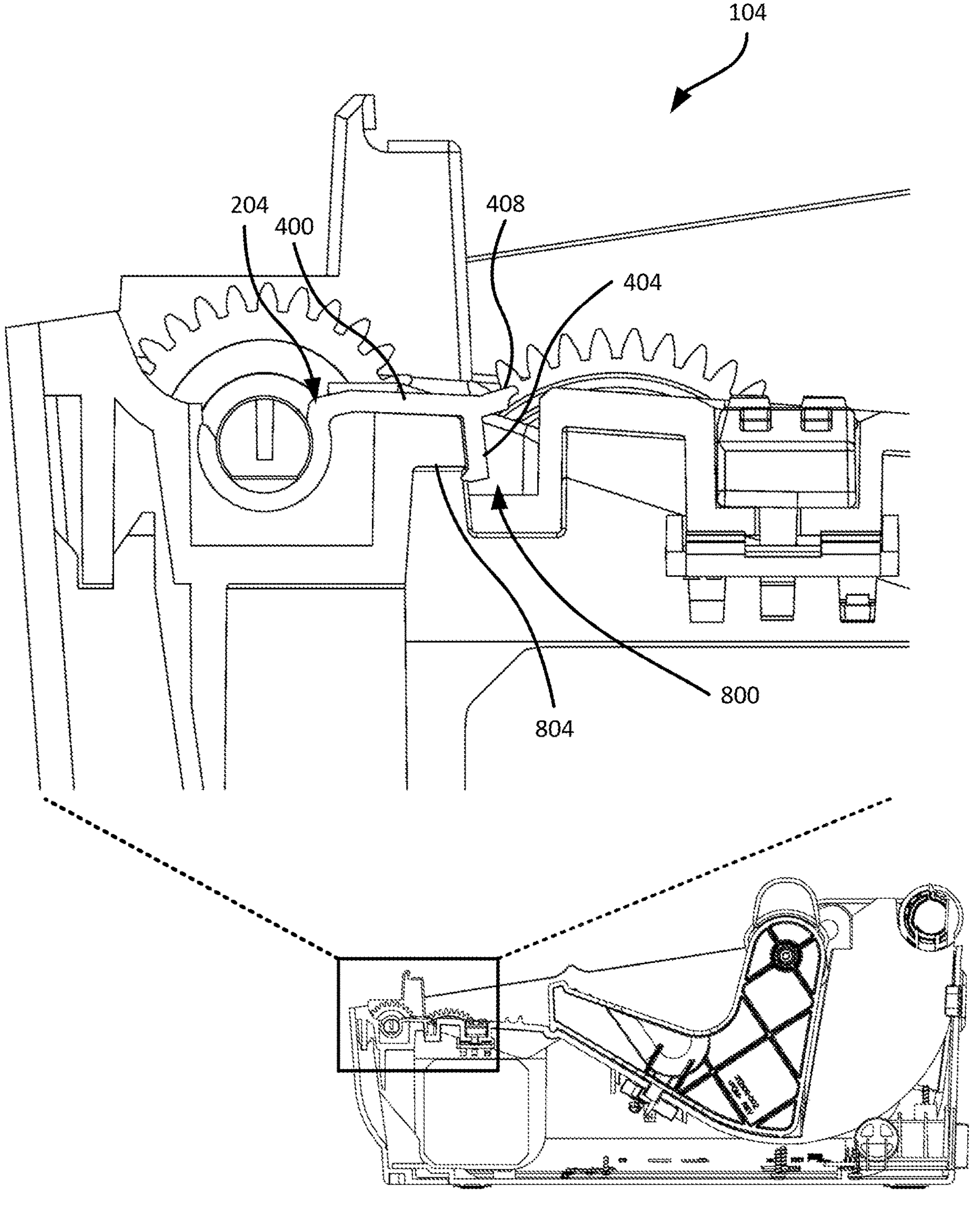
FIG. 8 is a detailed side cross-sectional view of the lower frame of the printer of FIG. 1A at a lifting arm of the bushing.

For example, referring to FIG. 8, a cross-section of the lower frame 104, and in particular, the lifting arm 400 is depicted when the bushing 204 is in the secure position. The extended hook 404 may be received in a cavity 800 formed in the end piece 300 or in the lower frame 104 and may hook past a securing portion 804 of the end piece 300.

The cavity 800 may additionally provide a space to allow a user to reach the lifting tab 408. Accordingly, the lifting tab 408 may be slightly angled away from the extended hook 404 to provide additional space to insert, for example, a fingernail to lift up the lifting tab 408. In operation, a user may use the lifting tab 408 to unhook the extended hook 404 from the securing portion 804 and apply an upwards force on the lifting arm 400 to facilitate the rotation of the bushing 204 from the secured position to the unsecured position.

The lifting arm 400 extends from the bushing 204 such that the lifting arm 400 lies substantially flat relative to a functional surface of the lower frame 104 when the bushing 204 is in the secured position, as can be seen in FIGS. 3 and 8. The lifting arm 400 therefore does not impede normal operation of the printer 100 during print jobs.

Thus, the printer 100 is provided with tabs 208 which secure the bushing 204 in the opening 304 during print operations, under forces exerted by the motor 120 or other internal components of the printer 100. Additionally, the tab 208-1 is appropriately shaped to allow the bushing 204 to be removed from the opening 304 upon application of a sufficient force (greater than those exerted by the motor 120 and other internal printer components) for repair, maintenance, or the like.

As will be appreciated, the forces exerted by the motor 120 may primarily be experienced at the end of the channel 200 proximate the motor 120, and hence the tabs 208 may be located on the end piece 300 at said end. In other examples, the end piece at the opposing end of the channel 200 may also include corresponding tabs to maintain the corresponding bushing in the corresponding opening at the opposing end of the platen roller 116.

In the foregoing specification, specific embodiments have been described.

However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising." "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:

receiving a platen assembly in a channel of a printer, the platen assembly including a platen roller and a bushing, the bushing connected to the platen roller, the bushing having a wing extending radially from the bushing, the bushing being received with an end piece defining an end of the channel; and rotating the bushing about an axis of rotation of the platen roller to move the bushing from an unsecured position in which the wing extends from the bushing at a first side of a tab on the end piece and a secured position in which the wing interfaces with the tab at a second side of the tab opposite the first side of the tab, wherein the tab comprises an entry surface at the first side of the tab, the entry surface angled to guide the wing past the tab as the bushing rotates from the unsecured position to the secured position, wherein the bushing further comprises a second wing extending from the bushing, substantially opposite the wing, and wherein the lower frame further includes a second tab on the end piece, the second tab to interface with the second wing.

2. The method of claim 1, wherein the end piece defines a mouth of an opening, and wherein the tab is disposed on the end piece proximate the mouth of the opening.

3. The method of claim 1, wherein the tab comprises a retaining surface at the second side of the tab, wherein the retaining surface is substantially parallel to the wing to maintain the bushing in the opening.

4. The method of claim 3, wherein the retaining surface further comprises a stepped edge to facilitate rotation of the bushing from the secured position to the unsecured position upon application of at least a threshold force.

5. The method of claim 1, wherein the tab further comprises a sidewall between the first side and the second side of the tab, the sidewall angled to facilitate rotation of the bushing from the secured position to the unsecured position upon application of at least a threshold force.

6. The method of claim 1, wherein the tab extends from about a midpoint of the wing to an outer end of the wing.

7. The method of claim 1, wherein the second tab comprises a retaining surface, wherein the retaining surface is substantially parallel to the wing to maintain the bushing in the opening.

8. The method of claim 1, wherein the end piece defines the end of the channel proximate a motor of the printer which drives the platen roller.

9. A method comprising:

receiving a platen assembly in a channel of a printer, the platen assembly including a platen roller and a bushing, the bushing connected to the platen roller, the bushing having a wing extending radially from the bushing and a lifting arm, the bushing being received with an end piece defining an end of the channel; and urging the lifting arm of the bushing about an axis of rotation of the platen roller to rotate the bushing about the axis of rotation from an unsecured position in which the wing extends from the bushing at a first side of a tab on the end piece and a secured position in which the wing interfaces with the tab at a second side of the tab opposite the first side of the tab, wherein the tab comprises an entry surface at the first side of the tab, the entry surface angled to guide the wing past the tab as the bushing rotates from the unsecured position to the secured position, wherein the bushing further comprises a second wing extending from the bushing, substantially opposite the wing, and wherein the lower frame further includes a second tab on the end piece, the second tab to interface with the second wing.

10. The method of claim 9, wherein the lifting arm comprises:

an extended hook configured to hook past a securing portion of the end piece to further secure the bushing in the secured position; and a lifting tab configured to allow a user to lift the lifting arm.

11. The method of claim 9, wherein the end piece defines a mouth of the opening, and wherein the tab is disposed on the end piece proximate the mouth of the opening.

12. The method of claim 9, wherein the tab comprises a retaining surface at the second side of the tab, wherein the retaining surface is substantially parallel to the wing to maintain the bushing in the opening.

13. The method of claim 12, wherein the retaining surface further comprises a stepped edge to facilitate rotation of the bushing from the secured position to the unsecured position upon application of at least a threshold force.

14. The method of claim 9, wherein the tab further comprises a sidewall between the first side and the second side of the tab, the sidewall angled to facilitate rotation of the bushing from the secured position to the unsecured position upon application of at least a threshold force.

15. The method of claim 9, wherein the tab extends from about a midpoint of the wing to an outer end of the wing.

16. The method of claim 9, wherein the second tab comprises a retaining surface, the retaining surface is substantially parallel to the wing to maintain the bushing in the opening.

17. The method of claim 9, wherein the end piece defines the end of the channel proximate a motor of the printer which drives the platen roller.

* * * * *